March 1, 1927.
G. E. RYAN
1,619,092
HEATING AND HUMIDIFYING DEVICE
Filed March 2, 1926
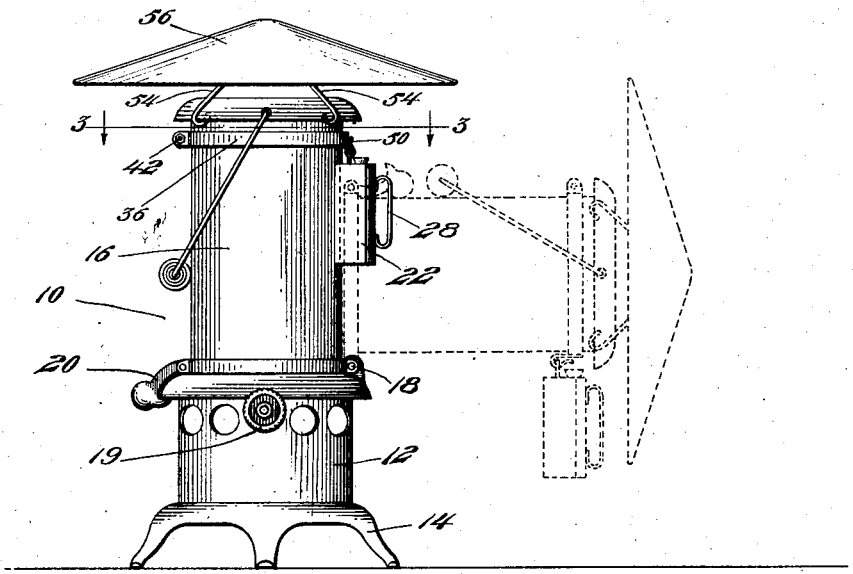
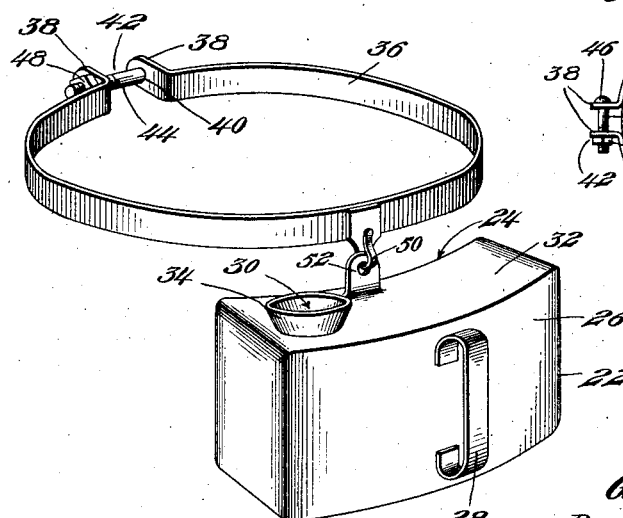
Inventor
George E. Ryan
By Thomas A. Jenckes Jr.
Attorney Patented Mar. 1, 1927.

1,619,092

UNITED STATES PATENT OFFICE.

GEORGE E. RYAN, OF TAUNTON, MASSACHUSETTS.

HEATING AND HUMIDIFYING DEVICE.

Application filed March 2, 1926. Serial No. 91,704.

My invention relates to a combined heating and humidifying device.

Upright heating units whether of the oil burning type, the coal burning type or the radiator or other type used to heat individual rooms, most of which are portable, if employed in a room for a long period of time are usually apt to make the air very dry. So far as I am aware, particularly in a standard portable upright oil heater no provision has heretofore been made for humidifying the heated air as it comes from the heater. The main object of my invention is to provide in combination with said heater a humidifier adapted to be used in conjunction with said heater to furnish a sufficient amount of humidity with the heat to make conditions in the room with the heating unit bearable. The main object of my invention is to combine a heating and humidifying device comprising an upright unit adapted to produce varying amounts of heat and a humidifier adapted to be detachably secured thereto and relatively vertically adjustably mounted thereon whereby said device may be adjusted to produce not only varying amounts of heat as usual but also in conjunction therewith varying adjustable amounts of humidity. As the drum portion of an upright heating unit is normally circular, I preferably provide a clamping band vertically adjustable to positions of different relative heat on the drum of said unit and means to detachably secure said humidifier to said band whereby said humidifier may be relatively vertically adjusted on said heater to come in contact with portions thereof of different degrees of heat so that said humidifier may give forth varying amounts of moisture to compensate for varying room conditions even if the heater is adjusted to give forth the same amount of heat.

A further object of my invention is to provide a humidifier which may be attached to the side of a heating unit more out of the way and in a more convenient and accessible place than the top of the unit, particularly where a heat deflection shield such as described in my former Patent #1,455,551 is employed, where there normally is not room to insert a bowl of water or any other of the crude humidifying devices hitherto employed underneath said shield.

As explained, I preferably secure a band around the drum of said heating unit and hingedly mount the humidifier on the said band so that the side of said humidifier may compactly conform to and lie adjacent to the side of said heating unit. Heating units, particularly those of the oil burning type are provided with means to pivot the drum portion thereof away from the base thereof so that the burner base thereof may be readily lighted or filled. I preferably pivotally attach the humidifier to said clamping band over the hinge of said heating unit drum to said heating unit base so that when the heating unit drum is swung to an open position, said humidifier may freely swing on said band to remain in a horizontal plane so as not to spill the liquid contents thereof.

A further object of my invention is to provide a humidifier which conforms in shape to the side of the heating unit to secure a greater amount of efficiency.

These and such other objects of my invention as may hereinafter appear will be best understood from a description of one embodiment thereof such as is shown in the accompanying drawings.

In the drawings, Fig. 1 is a side elevation of an upright heater having a heat deflection shield attached thereto and my improved humidifier attached thereto adjustable to different relative positions on the heater drum, the position that the humidifier takes when the heater cover is swung to an open position being shown in dotted lines.

Fig. 2 is a perspective view of the band I employ for attaching the humidifier to the heating unit and my improved type of humidifier hingedly mounted thereon.

Fig. 3 is a sectional view taken along the line 3—3 of Fig. 1.

In the drawings, wherein like characters of reference indicate like parts throughout, 10 generally indicates a standard portable oil heater, which comprises the burner base 12 provided with the suitable legs 14 for mounting it on the floor and the drum portion 16 pivotally secured to said base by the pivot pin 18. The heater 10 is provided with the usual means whereby the heat produced thereby may be adjustably varied on turning the wick adjusting screw 19. In my preferred embodiment as is common in oil heaters the heating unit 10 is of a generally substantially cylindrical configuration, the drum portion 16 being also of a substantially cylindrical shape. The drum portion 16 is normally engaged with the base by means of the clamp 20, and if the clamp 20 is released, the drum portion 16 may be swung away from the base 12 on the pivot pin 18 for lighting, filling or other purposes as is shown in dotted lines in Fig. 1. Though I have shown my invention in use on an upright heating unit specifically comprising the common type of portable oil heater, it is obvious that my invention may be employed on any type of upright heating unit of any configuration whether it be a coal heater, electric heater, radiator, or otherwise and I therefore in the claims employ the words "an upright heating unit" to include any of the well known types thereof.

To produce a desired amount of humidity in the room along with the heat given forth by the heating unit, I preferably provide as a part of my device in combination with the heating unit a humidifier. In my preferred embodiment, said humidifier comprises the preferably enclosed liquid receptacle 22, preferably of substantially oblong configuration and preferably having the inner side 24 and outer side 26 thereof of a curvature substantially equal to that of the heating unit drum 16 so that when in adjusted position, the humidifier 22 may lie compactly substantially adjacent to the side of said unit. The humidifier 22 is provided with the handle 28 and also with the moisture discharge opening 30. In my preferred embodiment the liquid receptacle 22 comprising my humidifier is preferably enclosed and provided with a top 32, the moisture discharge opening 30 preferably having the funnel 34. It is thus obvious that the opening not only provides a moisture discharge opening, but also a convenient funnel for filling purposes.

As stated, I preferably provide means to adjustably mount my humidifier 22 on the heating unit 10 adjacent to the side thereof at different relative vertical positions thereon whereby my combined heating and humidifying device may be adjusted not only to produce varying amounts of heat but also varying amounts of humidity. In my preferred embodiment as shown to accomplish this result, I provide the clamping band 36. In the claims I employ the word "band" to include any type of means to vertically adjustably attach said humidifier 22 to said heating unit 10, whether said means actually encircles said heating unit 10 or not. In my preferred embodiment said band 36 is preferably circular and is adapted to encircle said heating unit drum 16. Said band is preferably split at a point on its periphery and the said split ends are preferably provided with outwardly radially projecting lugs 38 provided with suitable holes 40. I also provide means to adjustably draw the split ends of said band 36 together whereby its position may be vertically adjusted on said heating unit. In my preferred embodiment said means preferably comprises the locking bolt 42 which comprises the bolt provided with a usual bolt head 46 adapted to be inserted through the holes 40 in the outwardly flaring lugs 38 and provided at its opposite end after insertion through said holes with the nut 48 threadedly attached thereto. It is thus obvious that by adjustment of the nut 48 on said bolt 44 that the split ends of said band may be adjustably regulated so that the band may be adjustable vertically moved and tightened in a fixed position on said heating unit 10.

I also provide means to detachably secure said humidifier 22 to said clamping band 36, preferably by hingedly securing said humidifier 22 to said band 36. In my preferred embodiment I preferably provide said band with a depending hook 50 on the periphery thereof and I preferably provide said humidifier 22 with the upstanding eyelet 52 adapted to be inserted within said hook 50.

I have shown in the drawings a heat deflection shield of the type shown in my former Patent #1,455,551 attached to the top of the heating unit 10, the rods 54 thereof being attached as usual to the drum top and the shield 56 being suitably mounted on said rods 54 as usual. It is obvious that particularly where a heat deflection shield is employed, such as shown, that it is practically impossible to set a suitable type of humidifier on the top of the heating unit.

It is obvious that to adjust for varying degrees of humidity for a fixed amount of heat, it is merely necessary to unloosen the locking bolt 42 to move the clamping band 36 to a position of relatively less or greater heat on said drum 16 and to clamp the band 36 to said drum by tightening the locking bolt 42. It is also obvious that as the humidifier 22 is preferably provided with the curvilinear inner side 24 of substantially equal curvature to that of the drum 16 that the humidifier 22 will lie substantially adjacent to the side of the heater drum 16.

It is obvious that I have provided a combination heater and humidifier device which may be adjusted to produce both varying amounts of heat and varying amounts of humidity, that I have provided a convenient humidifying attachment adapted to be sold as a unit for existing types of upright heaters which may be readily vertically adjusted thereon to give forth different amounts of humidity and that I have provided a humidifier which may be adjustably attached to said heater in such a manner that it may freely swing on said heater and remain in a horizontal plane without spilling its liquid contents when said heater is swung to open position. Though my humidifier is preferably filled with water it is obvious that any suitable type of any moisture producing liquid may be employed.

It is understood that my invention is not limited to the specific embodiment shown and that various deviations may be made therefrom without departing from the spirit and scope of the appended claims.

What I claim as new and desire to secure by Letters Patent is:

1. A heating and humidifying device, comprising in combination, an upright heating unit of substantially cylindrical configuration, comprising a burner base, adjustable to produce varying amounts of heat and a substantially cylindrical drum hinged thereto and normally engaged with said base, but swingable away therefrom for lighting and filling purposes, a humidifier comprising an enclosed substantially oblong liquid receptacle having its inner side of a curvature substantially equal to that of the heating unit drum to lie substantially adjacent to the side of said unit and having a funnel on the top thereof and an eye on the inner top edge thereof, a circular split clamping band adapted to encircle said heating unit drum, a locking bolt to adjustably attach the split ends of said band together whereby its position may be vertically adjusted on said heating unit, said band having a depending hook adapted to substantially overlie the hinge of said burner drum to said burner base and adapted to engage the pivot eye of said humidifier whereby when said drum is swung to an open position said humidifier may freely swing to remain in a horizontal plane so as not to spill the liquid contents thereof.

2. A heating and humidifying device, comprising in combination an upright heating unit, comprising a base and a drum portion hinged thereto and normally engaged with said base, but swingable away therefrom, a humidifier comprising an enclosed liquid receptacle having a moisture discharge opening, a clamping band vertically adjustable on said heating unit, and means to detachably hingedly secure said liquid receptacle to said clamping band adjacent to the side of said unit substantially above the hinge of said drum to said base whereby when said drum is swung to an open position, said humidifier may freely swing to remain in a horizontal plane so as not to spill the liquid contents thereof.

In testimony whereof I affix my signature.

GEORGE E. RYAN.